United States Patent Office 3,452,071
Patented June 24, 1969

3,452,071
CYCLIC ORGANOSILICON COMPOUNDS CONTAINING ALKYLENE UNITS
Christian R. Sporck, Burnt Hills, N.Y., assignor to General Electric Company, a corporation of New York
No Drawing. Filed Dec. 29, 1966, Ser. No. 605,551
Int. Cl. C07d *103/02;* C10m *3/44*
U.S. Cl. 260—448.2        4 Claims

ABSTRACT OF THE DISCLOSURE

A cyclic organosilicon compound having the structure:

(1)
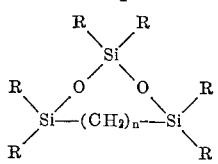

wherein R is a monovalent hydrocarbon radical free of aliphatic unsaturation, and $n$ is from 2 to 6. The compounds are very stable. The novel compounds find use as high temperature lubricants.

BACKGROUND OF THE INVENTION

Cyclic organsilicon compounds having alkylene units, in addition to siloxane bonds, are known in the prior art. For example, such cyclic compounds have been shown having the structure:

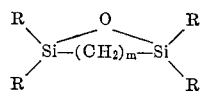

where R is, generally, as previously defined, and $m$ is from 2 to 4. For example, the compound where $m$ is 2 is described in Piccoli, Haberland, and Mecker, Journal of the American Chemical Society, vol. 82, 1883 (1960). When heated to high temperatures in the presence of either acids or bases, the ring structure of these materials is broken and a long chain polymer results.

Further, materials similar to Formula 1 are known where the alkylene bridge is replaced by an oxygen linkage, as in the standard hexaphenylcyclotrisiloxane or hexamethylcyclotrisiloxane. These materials, too, are known to polymerize easily in the presence of acids and bases.

BRIEF SUMMARY OF THE INVENTION

For a compound to be useful as a diffusion pump fluid, or as a high temperature lubricant, it is essential that it remain stable at the high temperature to which it will be subjected in those applications, even in the presence of impurities, and have low volatility at those temperatures. Materials which either break down into lower molecular weight compounds, or which are polymerized at high temperatures to long-chain, relatively high molecular weight materials, are not useful in these applications. Those compounds which break down to lower molecular weight materials are volatilized at the relatively high temperatures and under vacuum, while those materials which are polymerized to higher molecular weight materials are obviously unuseable as, in the case of diffusion pumps, they can no longer be moved by a liquid moving means, while as a high temperature lubricant they tend to prevent any movement of the adjacent surfaces.

A compound having the structure of Formula 1 was prepared, except that $n$ was equal to 1. The compound was easily polymerized. In view of the ready polymerizability of the compounds similar to those of Formula 1 it was entirely unexpected that the compounds of the present invention would prove stable at high temperatures, even in the presence of acids and bases. Thus, the compounds of the present invention are eminently suitable for use as diffusion pump fluids and high temperature lubricants.

The compounds of the present invention are those having both siloxane and alkylene linkages and having the formula:

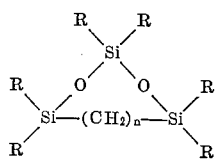

where R is a monovalent hydrocarbon radical free of aliphatic unsaturation, and $n$ is from 2 to 6. Thus, the compounds within the definition, which are stable to high temperatures, even in the presence of acids or bases, include those with two siloxane linkages and an alkylene bridge containing from 2 to 6 methylene units. Preferably, the compounds have 2 or 3 methylene units, i.e., ethylene or trimethylene bridges.

Each R is a monovalent hydrocarbon radical free of aliphatic unsaturation, and can be the same or different. Among the hydrocarbon radicals which can be present in the compounds of the present invention are alkyl radicals, such as, e.g., methyl, ethyl, propyl, octyl, octadecyl, etc.; and cycloalkyl radicals, such as, e.g., cyclohexyl, cycloheptyl, cyclopentyl, etc. Among the aryl radicals which R can represent are phenyl, biphenyl, naphthyl, para-phenoxyphenyl, tolyl, xylyl, etc.; and aralkyl radicals, such as benzyl, phenethyl, etc. The substituents are preferably methyl or phenyl.

DETAILED DESCRIPTION OF THE INVENTION

Preferably, the compounds of the present invention are prepared by reacting a dichlorodisilaalkane compound of formula:

(3)    

with a diorganosilanediol of formula:

(4)    

where R and $n$ are as previously defined. However, the reaction may also be carried out with a dihydroxydisilaalkane compound of formula:

(5)    

with a diorganodichlorosilane of formula:

(6)    

where R and $n$ are, again, as previously defined. In either case, the two compounds are preferably reacted in equimolar amounts, but a 10 percent excess, based on the stoichiometric ratio of 1:1, of either compound can be employed. The reaction is carried out in a solvent with a total reactant concentration of from 0.1 to 1.0 mole per liter. Preferably, each of the reactants is dissolved in a portion of the solvent, and the two solutions are added to a third portion of the solvent. However, neither the order of addition nor the manner of forming the solutions is critical, so long as the reactants dissolve quickly in the reaction mixture for easy reaction.

The solvents in which the materials are dissolved can be essentially any aliphatic or aromatic hydrocarbon solvent which is liquid under the conditions of reaction. When one of the reactants is the diorganosilanediol of Formula 4, it is often advantageous to dissolve the material in a mixture of the hydrocarbon solvent and acetonitrile, with the two solvents being mixed in equal volumes. This is to aid in dissolving the material. If desired, a cyclic nitrogen-containing compound, such as pyridine, can be substituted for the acetonitrile. The preferred hydrocarbon solvents are benzene, toluene, xylene, pentane, hexane, and heptane.

The reaction of the materials of Formulas 3 and 4 or of those of Formulas 5 and 6 generate hydrogen chloride as a by-produce, as illustrated in the equation below for the reaction of the materials of Formulas 3 and 4:

(7)
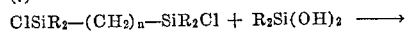

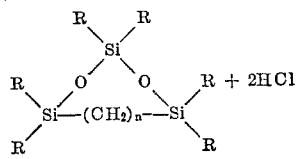

where R and $n$ are as previously defined. It is desirable to remove this hydrogen chloride as it is generated to prevent interference with the reaction. Therefore, an acid acceptor is mixed with the reaction solvent to absorb the hydrogen chloride as it is generated. The acid acceptors which can be used are selected from any of the well-known weak bases used as acid acceptors in similar reactions. For example, the tertiary amines, such as pyridine, picoline, 1,4-diazabicyclo(2,2,2)octane and the dialkyl anilines can be utilized. These acid acceptors absorb the generated hydrogen chloride in a molar ratio of 1:1. Thus, there must be at least one mole of acid acceptor used for each mode of hydrogen chloride produced. Preferably, the acid acceptor is present in an amount of from 25 to 100 percent in excess of the stoichiometric requirement, and can be present in an excess of several hundred percent.

The reaction can be accomplished at any temperature from about room temperature up to 50° C. Preferably, the reaction is run at room temperature for convenience, and because the reaction is accomplished so quickly, even at room temperature. However, when employing certain reactants, such as, diphenylsilanediol, the reaction should be carried out at a temperature closer to 50° C., since the diphenylsilanediol tends to precipitate from solution at temperatures lower than this and thus interferes with the course of the reaction.

The time of addition of the various reactants is immaterial, but preferably the solvent solutions of the reactants are added at equal rates to a third portion of the solvent containing the acid acceptor. The reaction mixture is then stirred for from about 15 minutes to 1 hour in order to assure completion of the reaction. The product is recovered by filtering the reaction mixture, particularly to remove the acid acceptor-hydrogen chloride salt and the filtrate is washed and the solvent evaporated. The crude product remaining is fractionated and, preferably, is reprecipitated to assure a higher purity. Among the materials which can be used for reprecipitation are ethanol, acetonitrile, and methylethylketone.

The formation of the cyclic organosilicon compounds of the present invention will now be described in greater detail. These examples should be considered as illustrative only, and not as limiting in any way the full scope of the invention as covered in the appended claims. All parts in the following examples are by weight.

Example 1

This example illustrates the preparation of the material of Formula 1 where the R substituents on one of the silicon atoms are phenyl, the remaining R substituents are methyl, and $n$ is 2. A quantity of 21.5 parts of 2,5-dichloro-2,5-dimethyl-2,5-disilahexane was dissolved in 140 parts of benzene to form a first solution. A quantity of 21.6 parts of diphenylsilanediol was dissolved in a mixture of 62.5 parts of acetonitrile and 70 parts of benzene to form a second solution. The temperature of the second solution was maintained at about 50° C. to assure the retention of the diphenylsilanediol in solution. A third solution was formed containing 32 parts of pyridine dissolved in 350 parts of benzene. Over a period of 35 minutes, the first and second solutions were added, simultaneously and at equal rates, to the third solution, with stirring. The reaction mixture was stirred for about 15 minutes following completion of the addition and the solids were then filtered from the reaction mixture and the solvent evaporated. The residue from the distillation was dissolved in toluence, filtered, and the toluene evaporated from the filtrate. The solid residue was then vacuum distilled at 125° C. at 0.02 mm. of mercury and yielded a product distillate with a melting point of 55–56.5° C. This material had the structure:

(8)
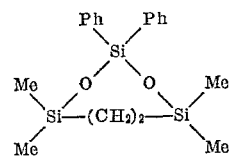

where Ph is the phenyl radical and Me is the methyl radical. This material corresponds to generic Formula 1 as previously described in this example. The structure of the compound of Formula 8 was substantiated by an infrared spectrum.

After recrystallization twice from ethanol, employing about 0.4 part of ethanol for each part of solids, the material melted at 57–58° C. Vapor phase chromatography showed a single peak consistent with the expected material. Analysis showed 59.8% C, 7.3% H, and 23.5% Si. Theoretical is 60.4% C, 7.3% H and 23.5% Si.

A quantity of 4 parts of the cyclic organosilicon compound of Formula 8 was heated, with stirring, at 125° C. A quantity of 40 parts per million, based upon the cyclic material, of potassium naphthalene was added. No change in viscosity was observable after 5 minutes. A second quantity of 40 parts per million of potassium naphthalene was added and no change was observable after a further 10 minutes. The temperature of the stirred mixture was raised to 150° C. and a third 40 part per million addition of potassium naphthalene was made. No change could be seen in the viscosity of the mixture after 20 minutes. At that time a fourth 40 part per million quantity of potassium naphthalene, making a total of 160 parts per million, was added and no change could be seen in the material after a further 20 minutes.

Similarly, 2 parts of the material of Formula 8 was stirred at 145° C. and a quantity of 0.044 part of dimethylsulfoxide was added. Following this addition, a quantity of 40 parts per million, based upon the weight of the material of Formula 8, of potassium naphthalene was added and no change in the viscosity or the appearance of the stirred mixture was noted after several minutes. A second addition was made of the same amounts of dimethylsulfoxide and potassium naphthalene, but again no change was noted. A quantity of 80 parts per million of potassium naphthalene was added and heating was continued with stirring for an hour, but there was no detectable change in the appearance of the stirred mixture. An infrared spectrum was run on a quantity of the stirred mixture, but no change was detected from the original structure.

A quantity of 2 parts of the cyclic material of Formula 8 was dissolved in 8.5 parts of toluene and the solution was stirred. An 86 percent solution of sulfuric acid was added to the stirred solution in an amount of 0.11 part. The solution was stirred for several days, at room temperature, with no apparent change in the viscosity of the material. An infrared spectrum was run on this sample and showed no change from the original absorption pattern.

Example 2

This example illustrates the preparation of a material of Formula 1 where the R substituents on one silicon atom are phenyl, the remaining R substituents are methyl, and $n$ is 3. A reaction vessel was fitted with two addition vessels and a stirrer. A first solution was prepared containing 57.3 parts of 2,6-dichloro-2,6-dimethyl-2,6-disilaheptane in 350 parts of dry benzene and this was placed in one of the addition vessels. A second solution was prepared containing 54 parts of diphenylsilanediol in a mixture of 175 parts of dry benzene and 155 parts of dry acetonitrile. The second solution was placed in the other addition vessel. A quantity of 880 parts of dry benzene and 79 parts of dry pyridine were placed in the reaction vessel. The first and second solutions were transferred from the addition vessels to the reaction vessel, at equal rates, over a period of 45 minutes, while stirring. The mixture was stirred for 15 to 20 minutes more to assure completion of the reaction. The resulting pyridine hydrochloride was filtered off and the solvent evaporated.

The residue was dissolved in 260 parts of toluene and the solution filtered. The filtrate was washed with water until the silver nitrate showed no chloride ion in the water washes. Toluene was then evaporated. The residue was distilled under vacuum and 57.9 parts of crude product was collected between 129 and 140° C. at 0.05 mm. of mercury. This product was dissolved in 40 parts of hot acetonitrile, the solution was filtered and cooled to precipitate solids. The resulting crystals were recovered and had a melting point of 68–68.5° C. The product had the structure:

(9)
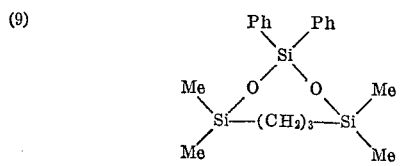

where Ph is the phenyl group and Me is the methyl group. The structure was substantiated by an infrared spectrum and contained 61.7% C, 7.7% H and 23.4% Si. Theoretical: 61.4% C, 7.5% H and 22.7% Si.

A quantity of 2 parts of the cyclic organosilicon compound of Formula 9 was heated to 150° C. while stirring. To the stirred cyclic compound was added 20 parts per million, based upon the cyclic, of potassium hydroxide and stirring was continued. There was no change observable in the viscosity or appearance of the material after 10 minutes. At that point, another 20 parts per million of potassium hydroxide was added and, after one and one-half hours, the material remained unchanged.

A quantity of 2 parts of the material of Formula 9 was again heated to 150° C. with stirring and 40 parts per million, based upon the weight of the cyclic, of potassium naphthalene was added. After 30 minutes, no change was noted in the appearance of the material and another 40 parts per million of potassium naphthalene was added. Again, after 1 hour, there was no change in the appearance of the material.

To show the stability of the cyclic material of Formula 9 in the presence of acid, a quantity of 2 parts of the material was dissolved in 8.5 parts of toluene. At room temperature, 0.11 part of 86 percent sulfuric acid was added and stirring was continued for about 1 hour. An infrared spectrum was then run on a sample of the material and showed no change from the original structure. Had there been polymerization, a broadening would have been noted in the scan. Infrared spectra were run again after 6 and 13 hours, but again showed no change.

Example 3

A quantity of 50 parts of 2,4-dichloro-2,4-dimethyl-2,4-disilapentane was dissolved in 350 parts of benzene to form a first solution. A second solution was prepared by dissolving 54 parts of diphenylsilanediol in a mixture of 175 parts of benzene and 155 parts of acetonitrile. The latter solution was heated to about 50° C. to assure the dissolution of the diol material. A third solution was prepared containing 78 parts of pyridine in 808 parts of benzene. The first two solutions were added to the third solution simultaneously with stirring, over a period of about 1 hour. Stirring was continued for about 20 minutes to assure completion of the reaction. Pyridine-hydrochloride salts which formed were filtered and solvents evaporated from the filtrate. The remaining material was dissolved in benzene and washed with distilled water until silver nitrate showed no chloride ion in the wash water. Solvents were evaporated, the residue was dried in a vacuum and the resulting solids were distilled to yield a material boiling at from 100 to 104° C. at 0.015 mm. of mercury. The distillate melted at 57–59° C. Recrystallization of a portion of this material in acetonitrile yielded a material with a melting point of 59–60° C. The material was:

(10)
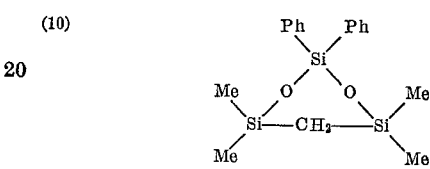

where Ph is phenyl and Me is methyl. Its structure was substantiated by an infrared spectrum and analysis showed 59.6% C, 7.1% H and 23.1% Si. Theoretical: 59.3% C, 7.0% H and 24.4% Si.

A quantity of 2 parts of the cyclic organosilicon compound of Formula 10, which had been recrystallized twice from acetonitrile, was heated to 125° C. with stirring. A quantity of 40 parts per million, based upon the weight of the cyclic material, of potassium naphthalene was added. Within a very few minutes, a polymer formed in the stirred mixture. A quantity of the polymer was removed and subjected to an infrared spectrum which confirmed the polymeric structure. This showed the instability of a material corresponding to Formula 1 where, however, $n$ is 1, as compared with the stability at high temperatures, in the presence of bases, of the materials of Formula 1 where $n$ is from 2 to 6, as shown in Examples 1 and 2.

Example 4

A material of the formula:

(11)
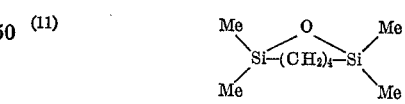

where Me is methyl, was prepared by treating 100 parts of 2,7-dihydroxy-2,7-dimethyl-2,7-disilaoctane with 0.675 part of trifluoroacetic acid in 1540 parts of benzene at reflux for about 2 hours. The reaction mixture was then cooled to room temperature, washed with distilled water, and dried. The benzene was removed by flash evaporation and the residue was fractionally distilled to yield the product boiling at 66–68° C. at 35 mm. of mercury. The purity of the product was found to be 98.9 percent.

A quantity of 0.12 part of 86 percent sulfuric acid was mixed with 2 parts of the material of Formula 10 and the mixture was stirred at room temperature. After only 2 minutes, there were signs of polymerization in the mixture. Stirring was continued for about 5 minutes, after which the polymerization had progressed to such a degree that the stirrer would no longer move. An infrared analysis of this material showed that the cyclic had been converted to a higher polymer containing —Si—O—Si— linkages. Similar results were obtained when the alkylene bridge of a compound similar to that of Formula 11 contained 2 and 3 methylene units.

Thus, valuable materials useful for diffusion pump fluids and high-temperature lubrication has been shown. As demonstrated, these materials are stable in the presence of acids and in the presence of bases at high temperatures. This is particularly surprising in view of the ability to polymerize very similar compounds, including those having one less siloxane linkage, those having one less methylene unit in the alkylene bridge and those having a siloxane linkage in place of the alkylene bridge. The specific formulations and methods of formation just described should not be considered as limiting in any way the full scope of the invention as covered in the appended claims.

What I claim as new and desire to secure by Letters Patent of the United States is:

1. A cyclic organosilicon compound having the formula:

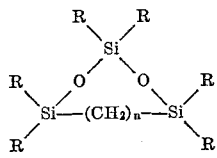

where R is a monovalent hydrocarbon radical free of aliphatic unsaturation and $n$ is from 2 to 6.

2. The cyclic organosilicon compound of claim 1 wherein each R is individually selected from the class consisting of methyl and phenyl.

3. The cyclic organosilicon compound of claim 1 having the formula:

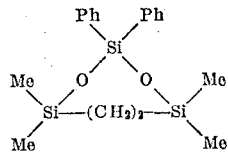

where Ph is the phenyl radical and Me is the methyl radical.

4. The cyclic organosilicon compound of claim 1 having the formula:

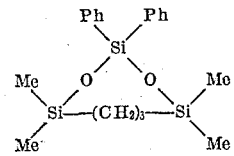

where Ph is the phenyl radical and Me is the methyl radical.

References Cited

UNITED STATES PATENTS 2,582,799   1/1952   Sauer.
3,385,877   5/1968   Wu.

TOBIAS E. LEVOW, *Primary Examiner.*

P. F. SHAVER, *Assistant Examiner.*

U.S. Cl. X.R.

252—49.6